July 2, 1929.  C. E. MILLER  1,719,713
BARBECUING MACHINE
Filed Oct. 15, 1927  3 Sheets-Sheet 1
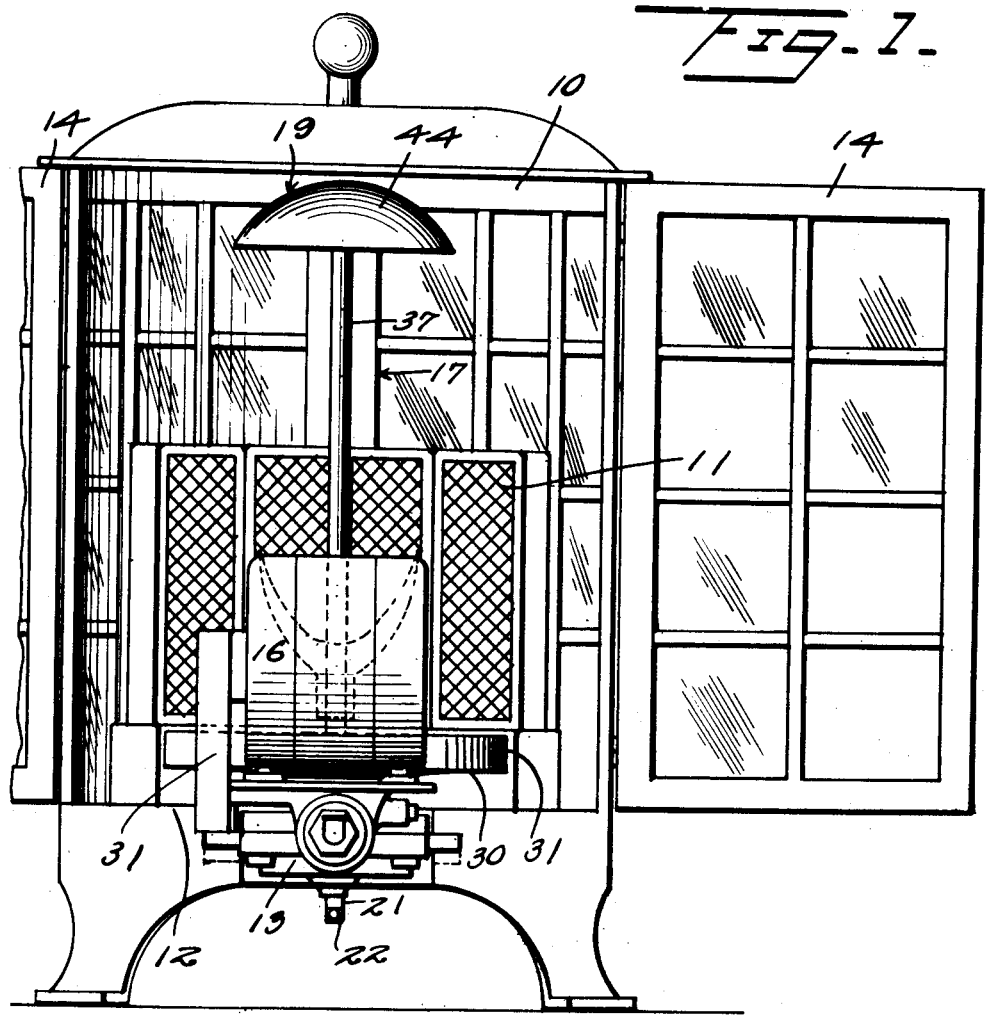
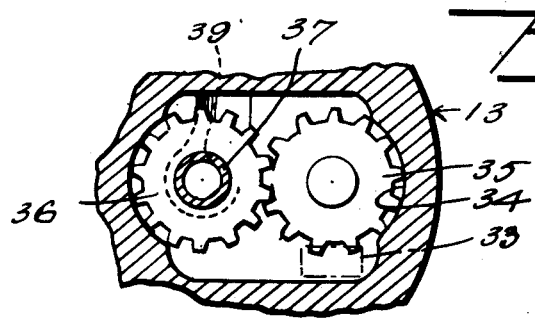
Inventor
C. E. Miller
By John P. Duffy
Attorney

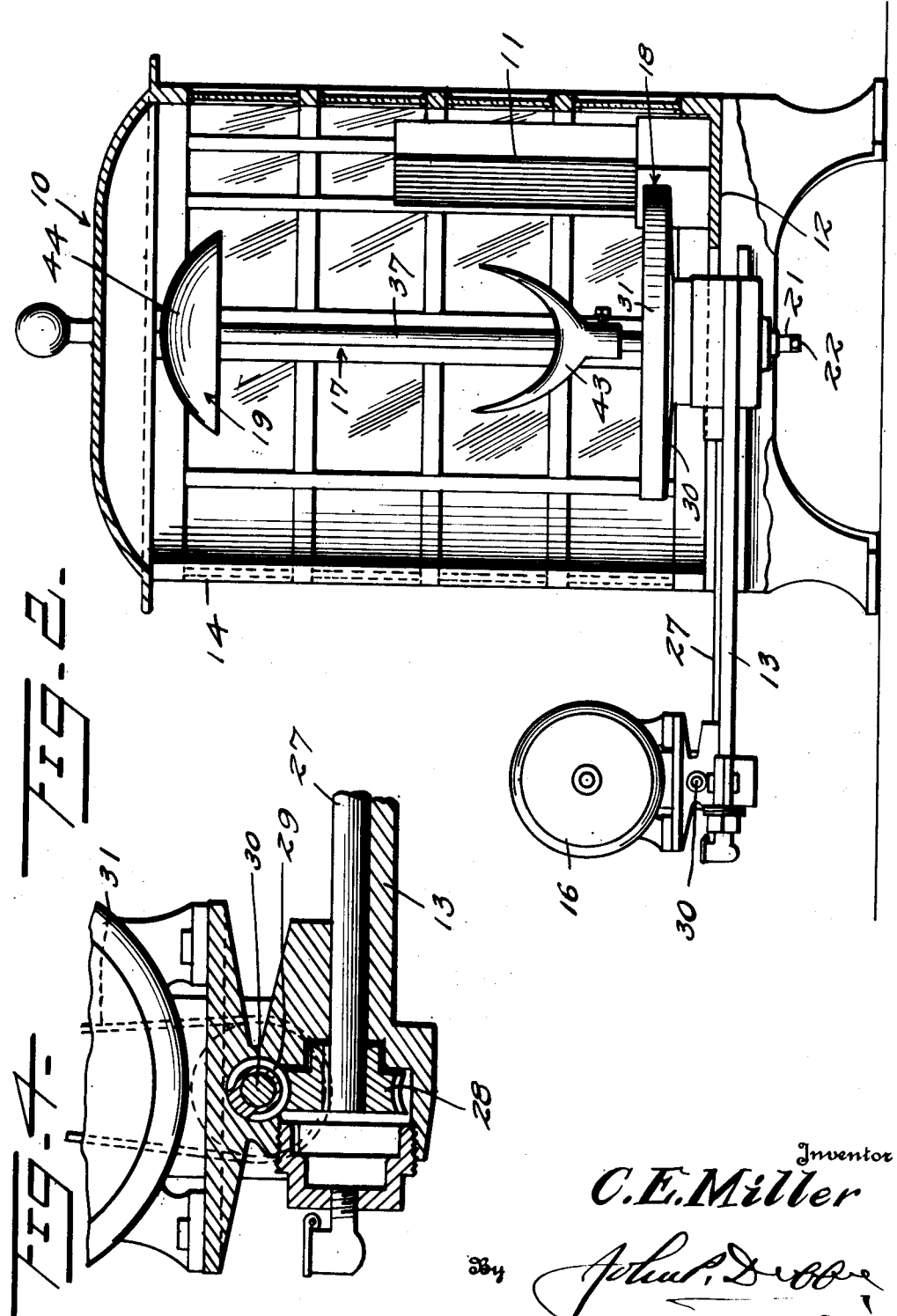

July 2, 1929.  C. E. MILLER  1,719,713
BARBECUING MACHINE
Filed Oct. 15, 1927   3 Sheets-Sheet 3
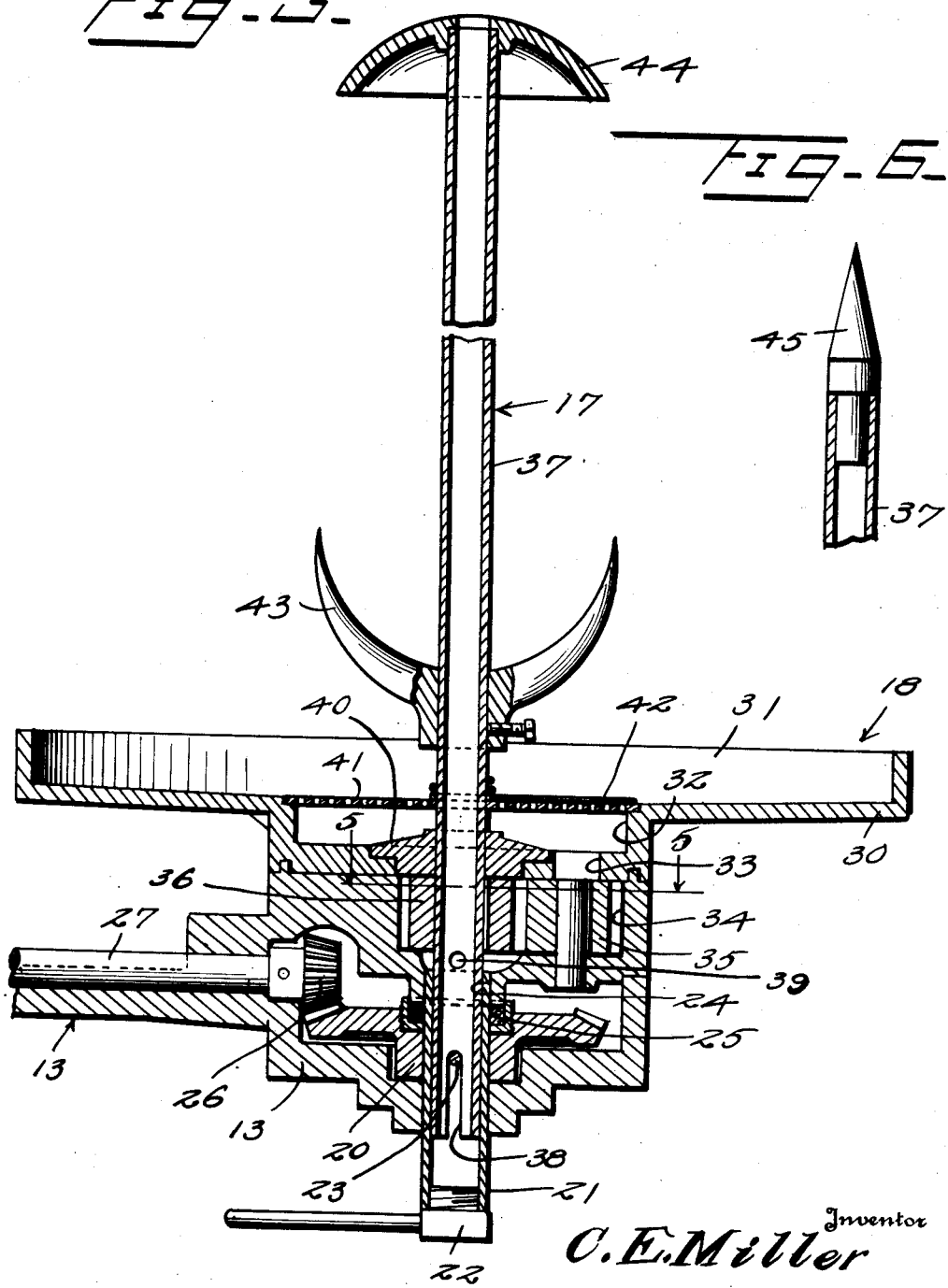

Patented July 2, 1929.

1,719,713

UNITED STATES PATENT OFFICE.

CHARLES E. MILLER, OF ANDERSON, INDIANA.

BARBECUING MACHINE.

Application filed October 15, 1927. Serial No. 226,365.

This invention relates to barbecuing devices.

An important object of the invention is the provision of a construction such that the meat to be barbecued may be readily supported in opposition to and adjusted toward and away from the burner supplying the heat for the roasting operation.

A further and more important object of the invention is the provision in a construction of this character of a novel and improved basting mechanism whereby the juices of the meat driven therefrom during roasting are collected and distributed over the surface of the meat as it is being roasted.

A further object of the invention is to provide a device of this character in which the meat placed upon a spit or rotating structure is slowly rotated before the burner and the rotation of the spit provides the necessary driving mechanism of a pump, by means of which the juices of the meat are caused to pass thereover during the roasting operation.

A still further object of the invention is to improve the general structure of devices of this character so as to permit them to be more readily manipulated and the roasting operation more readily observed.

These and other objects I attain by the construction shown in the accompanying drawings, wherein for the purpose of illustration is shown a preferred embodiment of my invention and wherein:—

Figure 1 is a side elevaton of a barbecuing machine embodying my improvements.

Figure 2 is a vertical transverse section, taken at right angles to Figure 1.

Figure 3 is an enlarged vertical longitudinal section of the spit, base and associated parts.

Figure 4 is a detail fragmentary sectional view of the outer end of the shaft and its driving means.

Figure 5 is a horizontal section, taken on line 5—5 of Figure 3 and Figure 6 is a detail sectional view of the upper end of the spit and fork point.

Referring now more particularly to the drawings, the numeral 10 generally designates a casing within which is arranged a burner 11 disposed adjacent one side thereof. The casing has a bottom structure 12 and upon this bottom structure, the base 13 is shiftable toward and away from the burner.

The casing is provided with doors 14, which may be swung to open position to permit access to the roasting meat for seasoning or to permit the meat to be shifted by shifting of the base, as will hereinafter more fully appear, to a point where it may be readily removed.

The base 13 at its outer end supports a motor 16 having driving connections with a vertically extending spit 17, which will be hereinafter more fully set forth. The spit extends upwardly from a bowl 18, supported by the base and adapted to collect juices from the meat. From this bowl, the juices are delivered to the upper end of the spit through an opening formed therein in a manner more fully hereinafter described and passed over a distributer 19, so that they drip down to all parts of the meat supported from the spit.

The base 13 at its inner end provides a housing for a gear 20, which gear has extended through the hub thereof a vertical tube 21, the lower end of which extends through the bottom of the base and is provided with a removable drain plug 22. A pin 23 extending through the tube and gear maintains these elements against relative rotation. The tube at its upper end extends into a guide bore 24 provided in the base and is packed thereto, as at 25, for a purpose presently to appear.

The gear 20 is engaged by a gear 26 on the inner end of a shaft 27, the outer end of which has a worm 28 meshing with a worm 29 upon a shaft 30 belt-driven from the motor, as indicated at 31. It will be obvious that the gear 20 will be driven at a relatively low rate of speed.

Seated upon the upper surface of the inner end of the base is a plate 30 having an upstanding peripheral flange 31. The plate 30 is provided centrally with a sump 32 discharging through a port 33 in the bottom wall of the plate to a recess 34 in the upper surface of the inner end of the base within which are arranged the gears 35 and 36 of a gear pump. The gear 36 is secured to a tubular spit 37 adjacent the lower end thereof and this spit has its lower end extended into the tube 21 and forked at 38 to straddle the pin 23, securing the tube and gear to one another. Immediately upon the upper end of the tube 21, the spit 37 has formed through the wall thereof an opening 39 which, when the spit is in position, communicates with the discharge of the gear pump. The bottom wall of the sump 32 has an axial opening of sufficient size to permit the passage of the gear 36 and this opening is closed by a plug 40 surrounding the spit. The top of the sump is screened at 41 and this screen is cleaned, by means of a spring finger 42 secured to the spit 37 and revolving over the surface of the screen as the spit rotates.

Adjustably mounted upon the spit is a fork 43 adapted to engage the lower end of and support the meat which is being roasted. Upon the upper end of the spit, is removably mounted a concavo-convex spreader 44, the convex face of which is upwardly disposed. This spreader may be removed and a fork point 45 substituted therefor when the spit is being inserted through a piece of meat to be cooked.

In operation, the fork point 45 is placed in position upon the end of the spit and the spit forced through the meat against the adjustable fork 43. The spit is then placed in position in the tube 21, the meat adjusted into proper relation to the burner and the motor started. The meat slowly rotating before the fire is cooked externaly and the juices dripping therefrom fall upon the plate 30 and pass through the screen 41 into the sump 32. From this sump, the juices pass to the pump through the port 33 and by this pump are forced upwardly through the tubular spit and discharging from the upper end thereof pass downwardly over the convex face of the spreader 44 and drip upon the meat to baste the same. It will, of course, be understood that initially a certain amount of seasoned lard or grease may be added to start circulation.

Attention is directed to the fact that these juices being very highly heated, will heat the tubular spit 37, with the result that the meat will be interiorly, as well as exteriorly heated, thus materially expediting the cooking operation. It will also be obvious that a very thorough basting action will be continuously provided and this without the addition of any extra structure, with the exception of the gears 35 and 36 of the pump. When the cooking operation has been completed, the spit and the lower end of the tube 21 may be drained by removing the plug 22. Since the motor and spit are mounted upon a common base and are movable as a unit toward and away from the heater, it will be obvious that the meat may be kept at the desired temperature with great ease and by making the walls of the casing as windows, the panes of which are formed of fire resisting glass or similar material, the cooking operation may be continuously observer.

Since the construction hereinbefore set forth is capable of a certain range of change and modification without materially departing from the spirit of the invention, I do not limit myself to such specific structure except as hereinafter claimed.

I claim:—

1. In a barbecuing machine, a vertically extending tubular spit, means for rotating the same, a bowl at the lower end of the spit receiving juices driven from meat roasting thereon, a pump receiving juices from said bowl and delivering the same into the tubular spit, means at the upper end of the tubular spit for distributing the juices over meat carried thereby, said bowl having a sump through which the juices pass to the pump, a screen for the sump and a cleaner for said screen operated by rotation of the spit.

2. In a barbecuing device, a vertically extending tube having a closed lower end, means for rotating the same, a tubular spit having its lower end removably splined to the tube, a bowl through which the spit extends, means upon the spit for supporting meat to be roasted, a pump receiving juices collected from the meat by the bowl and delivering the same to the interior of the spit above the upper end of the tube, a distributer at the upper end of the spit for directing juices forced from said upper end by the pump outwardly and downwardly over meat supported by the spit, said pump being a gear pump and having one of the gears thereof secured to said spit and removable therewith, the bottom of the bowl having a sump the bottom wall of which includes a removable plug the removal of which provides a space through which the gear may be inserted and removed.

3. In a barbecuing device, a vertically extending tube having a closed lower end, means for rotating the same, a tubular spit having its lower end removably splined to the tube, a bowl through which the spit extends, means upon the spit for supporting meat to be roasted, a pump receiving juices collected from the meat by the bowl and delivering the same to the interior of the spit above the upper end of the tube, a distributer at the end of the spit for directing juices forced from said upper end by the pump outwardly and downwardly over meat supported by the spit, said pump being a gear pump and having one of the gears thereof secured to said spit and removable therewith, the bottom of the bowl having a sump the bottom wall of which includes a removable plug the removal of which provides a space through which the gear may be inserted and removed, the sump having a screen therover and means carried by the spit and operating over the screen for cleaning the same.

4. In a barbecuing device, a vertically extending tube having a closed lower end, means for rotating the same, a tubular spit having its lower end removably splined to the tube, a bowl through which the spit extends, means upon the spit for supporting meat to be roasted, a pump receiving juices collected from the meat by the bowl and delivering the same to the interior of the spit above the upper end of the tube, a distributor at the upper end of the spit for directing juices forced from said upper end by the pump outwardly and downwardly over meat supported by the spit, said pump being a gear pump and having one of the gears thereof secured to said spit and removable therewith, the bottom of the bowl having a sump the bottom wall of which includes a removable plug the removal of which provides a space through which the gear may be inserted and removed, the sump having a screen thereover, an arm extended over said screen and a connection between the arm and said spit yieldably forcing the arm into engagement with the screen and rotating the same as the spit is rotated.

In testimony whereof he affixes his signature.

CHARLES E. MILLER.